United States Patent [19]
Nacman

[11] Patent Number: 5,485,195
[45] Date of Patent: Jan. 16, 1996

[54] MULTI-PHASE PIXEL CLOCK FOR A RASTER OUTPUT SCANNER (ROS) PRINTER

[75] Inventor: Aron Nacman, Penfield, N.Y.

[73] Assignee: Xerox Corporation, Stamford, Conn.

[21] Appl. No.: 78,337

[22] Filed: Jun. 21, 1993

[51] Int. Cl.⁶ ............................................. H04M 1/21
[52] U.S. Cl. ............................................. 347/247
[58] Field of Search ................. 346/1.1, 108, 107 R, 346/76 L, 160; 347/247, 248, 249, 237

[56] References Cited

U.S. PATENT DOCUMENTS 4,422,083  12/1983  Neumann et al. .................. 346/108
4,587,531   5/1986  Dangler ................................. 346/108
4,620,237  10/1986  Traino et al. ........................ 358/300
4,677,292   6/2987  Shimada .............................. 250/235
5,305,023   4/1994  Fukushige et al. ................. 346/108

*Primary Examiner*—Mark J. Reinhart

[57] ABSTRACT

Fast scan jitter in a ROS scanning system is substantially reduced by use of a multi-phase clock derived from a crystal oscillator. The rising edge of a start-of-scan signal is compared to the clock signal and the phase of that clock signal which is next in time to the SOS signal is used for that scan. For one example given, the scan-to-scan jitter is limited to within ⅛ the pixel period with even higher levels of accuracy possible.

6 Claims, 9 Drawing Sheets

MULTI-PHASE PIXEL CLOCK FOR A RASTER OUTPUT SCANNER (ROS) PRINTER

BACKGROUND OF THE INVENTION AND MATERIAL DISCLOSURE STATEMENT

The present invention relates to a Raster Output Scanner (ROS) and, more particularly, to the use of a multi-phased crystal oscillator clock output to reduce ROS scan line jitter.

In polygon ROS laser printers, a laser generates a light beam which is modulated in accordance with information contained in video image signals. The modulated light beam is collimated and focused onto the surface of a rotating, multi-faceted polygon which scans the modulated light beam through a post-polygon optical system and onto the photosensitive imaging surface. The polygon is rotated by a motor with the rotational speed of the motor controlling the image resolution in the direction of motion of the imaging surface (process direction). Image resolution in the scanning direction is a function of the image signal, or pixel rate. The resolution in the scan direction is determined by the image signal or pixel clock frequency. Each mirrored facet of the polygon provides image information corresponding to one horizontal scan line. Each scan line is initiated by a generation of a start-of-scan (SOS) signal and ended by an end-of-scan (EOS) signal. The start-of-scan signal in turn initiates a pixel clock count which controls the modulation image information signal source which in turn controls the modulation of the laser output.

When using a crystal oscillator for the clock in a polygon ROS laser printer, facet jitter is a motor aberration which occurs at every scan line; i.e. every facet scan. Jitter is caused because the crystal frequency is asynchronous with the polygon rotational frequency, so that the SOS signal can occur at any point within one crystal clock period. This results in up to one clock period jitter of the image relative to the SOS, since the image leading edge is defined by the first pixel clock after the SOS rising edge. Prior art techniques for compensating for jitter disclose the use of oscillators which are enabled by an SOS signal with delay circuitry. These applications are described in, for example, U.S. Pat. Nos. 4,587,531 and 4,677,296. The oscillators described in these references are not stable enough over temperature ranges for printer applications requiring very stable pixel clocks.

According to a first embodiment of the present invention, the output of a crystal pixel clock oscillator is subdivided by delay and inverter circuitry into multiple phase outputs. Data latch and multiplexing circuitry is provided to select that clock phase output which is closest to the arrival, subsequent in time, to the SOS signal. As one example, the crystal oscillator output is subdivided into eight phased outputs. One of the outputs is identified as being closest in time to the arrival of the SOS signal and is used for the pixel clock. This particular scheme limits the scan-to-scan jitter to within ⅛ the pixel period. In a second and third embodiment, equal or greater jitter improvement is realized using circuitry that subdivides the oscillator outputs without using delay circuitry. More particularly, the present invention relates to a method of reducing fast scan jitter as the scanning beam of a Raster Output Scanner scans across a recording member, said scanner including means for modulating said beam in accordance with signal inputs controlled by a pixel clock, said method comprising the steps of:

detecting said recording beam prior to the start-of-scan (SOS) of a scan line and generating an SOS output signal having a rising and falling edge, subdividing the output of a crystal oscillator into multiple phased outputs, each output having a rising and leading edge separated by phase, identifying the phased output having a rising edge closest in time to the rising edge of the SOS signal, and using said identified phased output as the pixel clock for the scan line.

IN THE DRAWINGS

IN THE SPECIFICATION

Figure 1:
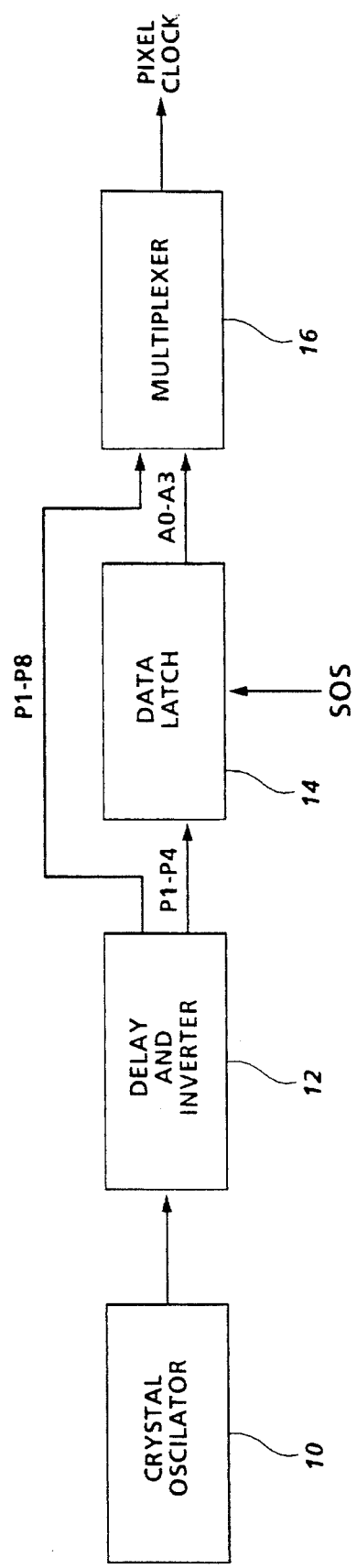
FIG. 1 shows a block diagram of a first embodiment of circuitry used to generate an accurate multi-phase pixel clock.

An exemplary ROS printer in which the present invention can be used is disclosed in U.S. Pat. No. 4,620,237, whose contents are hereby incorporated by reference. As shown in FIG. 1 of this reference, a pixel clock 16 provides the output signal which clocks the image signal, a line at a time, from image signal source 15. Clock 16 is triggered by start and end (SOS and EOS) signals generated by detectors 19 and 21 which are disposed in the path of ROS scanning beam 23.

Referring to FIG. 1 of the present invention, and, in a first embodiment, a crystal oscillator 10 serves as the source of pixel clock signals for operating the Raster Output Scanner portion of the printer. The oscillator output is subdivided by a delay and inverter circuit 12 which forms a plurality of multi-phased outputs, eight in number, in the embodiment shown in FIG. 2. Outputs P1–P4, phase separated by 45°, are loaded into data latch circuit 14. Outputs P1–P4 plus inverted outputs P5–P8 are sent as inputs to multiplexer 16. As will be described in detail below, a start of scan (SOS) signal is sent to data latch circuit 14 and the status of phases 1–4 are latched onto the rising edge of the SOS signal. The latched multiplexed outputs A0–A3 become the address for multiplexer 16. The logic circuitry in multiplexer 16 decodes the inputs A0—A3 and passes one of the P1–P8 inputs, the one which has the next rising edge after receipt of the SOS signal at data latch circuit 14. This passed phase signal becomes the pixel clock signal which is used for the entire scan line until the rising edge of the next SOS signal defines, possibly, a new clock phase to be used.

Figure 2:
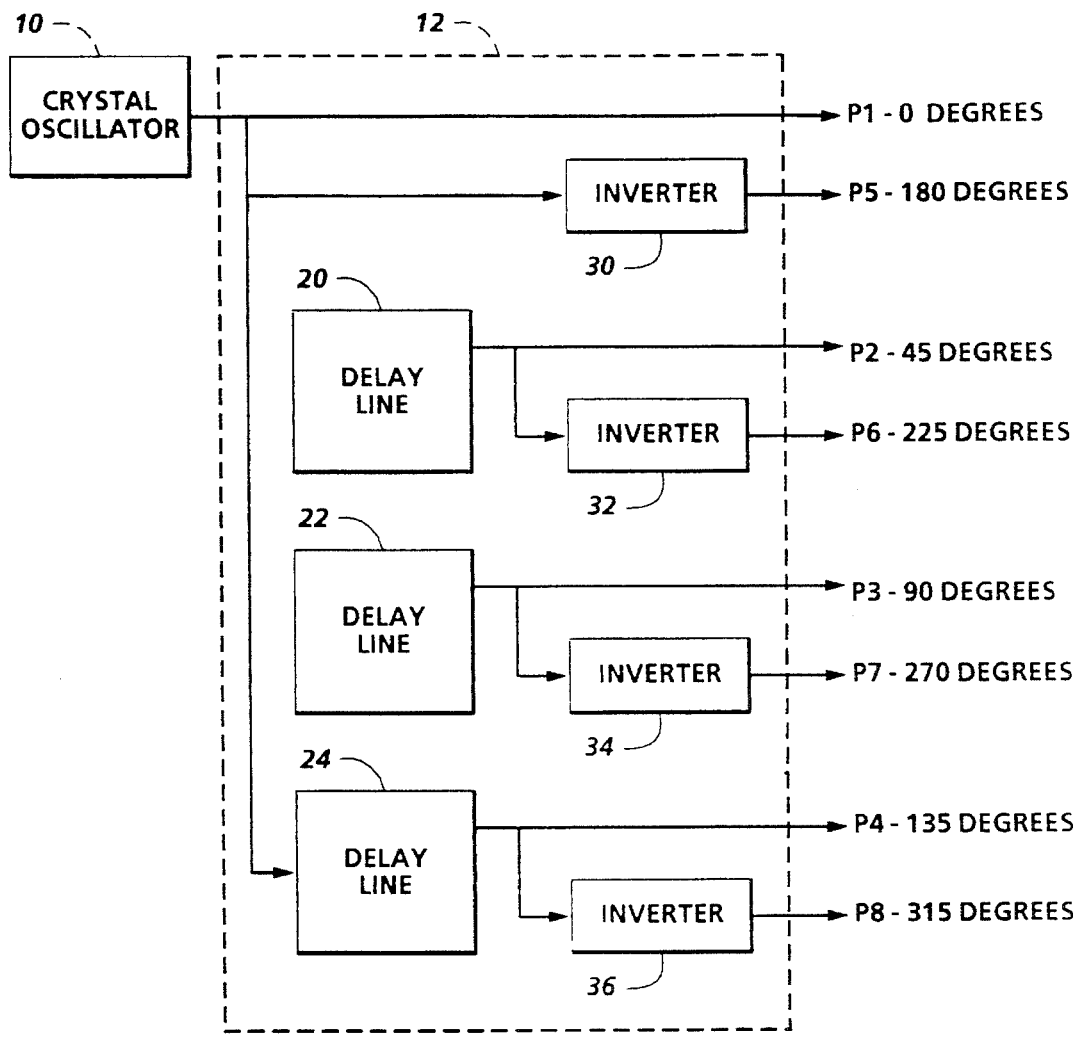
FIG. 2 shows the delay and inverter circuitry used to subdivide the output of the crystal oscillator of FIG. 1.
Figure 3:
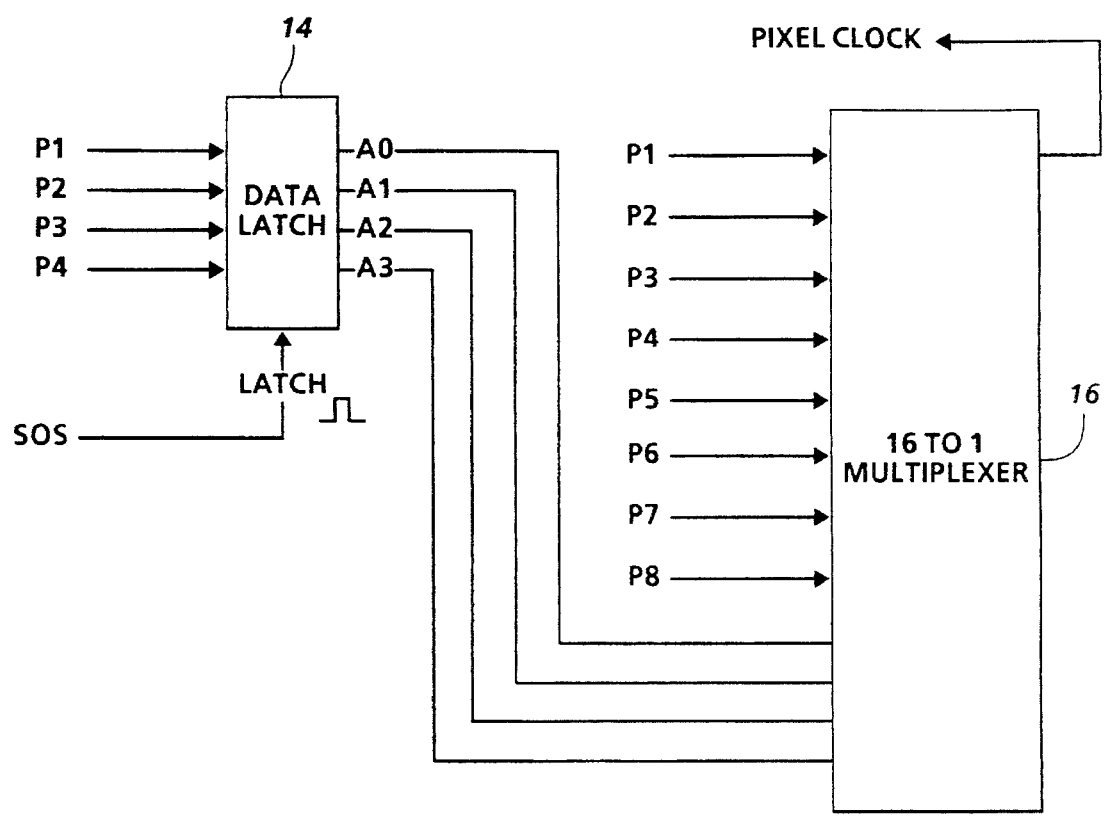
FIG. 3 is a circuit diagram of latch and multiplexing circuitry to enable identification of the optimum phase output to use as the pixel clock.
Figure 4:
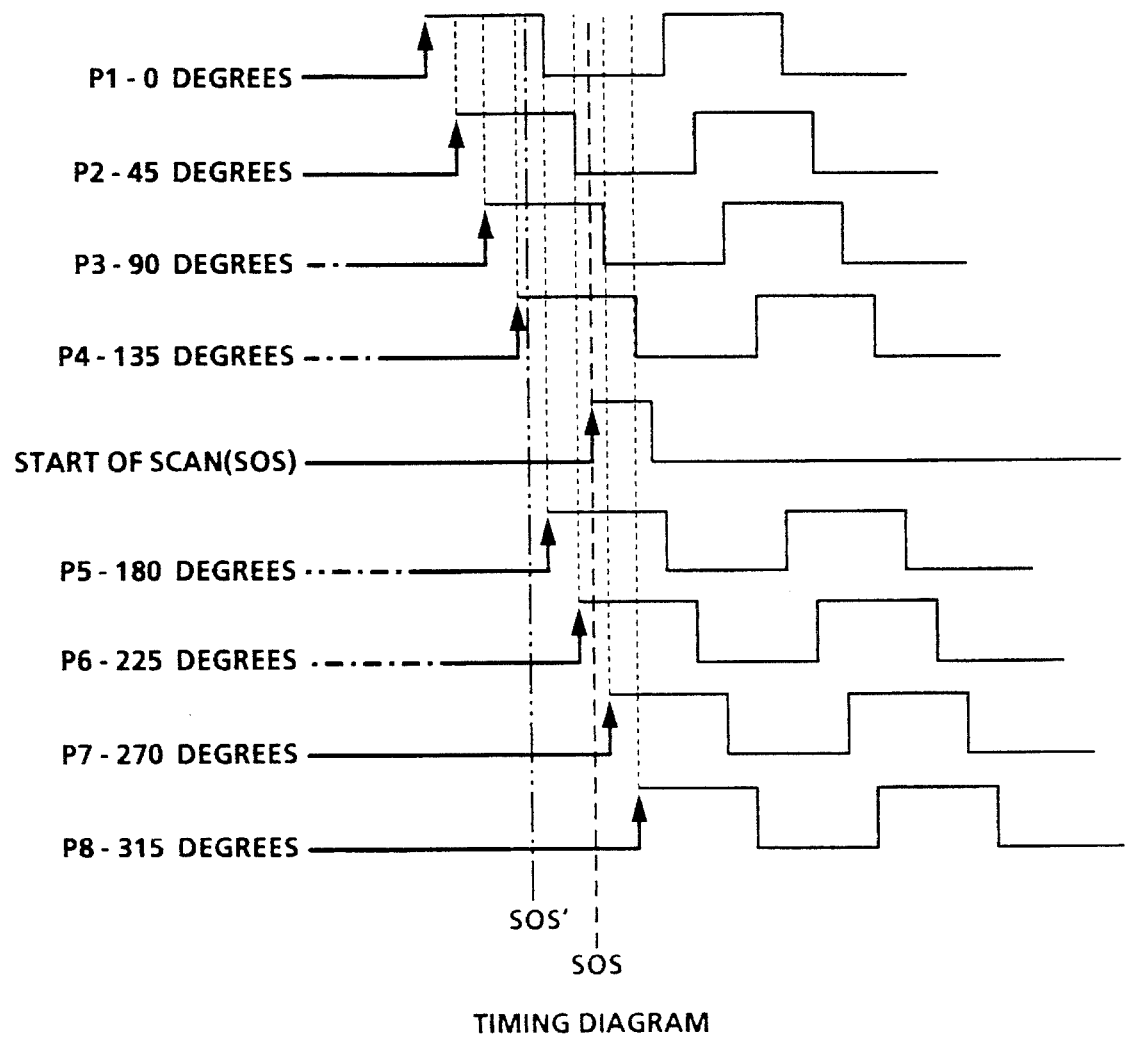
FIG. 4 is a timing diagram for the FIG. 3 circuit showing enablement of the phase signal closest to arrival of an SOS signal.

FIGS. 2, 3 and 4 show a specific embodiment for the circuitry of FIG. 1 where the oscillator 10 frequency is synthesized into eight phases that will translate into a jitter occurring at no more than ⅛ of a pixel. Referring to FIG. 2, the delay and inverter circuit 12 comprises delay lines 20, 22, 24 and inverters 30, 32, 34, 36. Delay line 20 introduces a delay equal to 1/8 of the oscillator period. Delay line 22 introduces a delay equal to 2/8 of the oscillator period. Delay line 24 introduces a delay equal to 3/8 of the oscillator period. The oscillator output identified as P1 has 0° phase shift. P1 inverted by inverter 30 becomes output P5, a 180° phase shift. The oscillator output passing through delay line 20 becomes output P2 with a 45° phase shift. P2 inverted by inverter 32 becomes output P6, a 225° phase shift. With the oscillator output passing through delay line 22, output P3 is generated with a phase shift of 90°. P3 inverted by inverter 34 becomes output P7, a 270° phase shift. The oscillator output through delay line 24 provides output P4, a 135° phase shift. P4 inverted becomes P8, a 315° phase shift. Thus, it is evident from FIG. 2 that, using the crystal oscillator output, an eight-phase clock has been synthesized. It is understood that if accuracy higher than 1/8 of a pixel is required, the oscillator frequency could be subdivided into more phases using more delay lines and inverters.

Turning now to FIG. 3, phases P1–P4 are inputted into a data latch circuit 14 so that the state of P1–P4 are latched onto every rising edge of the SOS signal. The latched outputs are generated as multiplexed address lines A0–A3 with the lines defining the eight possible states (signals P1–P8). A specific example is described with reference to the timing diagram of FIG. 4. Referring to FIGS. 3 and 4, the dotted vertical line represents the rising edge of the SOS signal. The instant state of each of signals P1–P8 is shown, each with a specific relationship with respect to the rising edge of the SOS signal., The instant state of phases P1–P4 can be considered as address vectors that define a desired clock phase output; e.g. that output which has the next rising edge closest to the rising edge of the SOS signal. For the example shown, output P7 has the next rising edge. Phases P1 and P2 are "low" and phases P3 and P4 are "high". Thus, one of the output signals A0–A3 will have an output address of 0011. Assuming this output signal is A0, logic and circuitry in 16:1 multiplexer 16 decodes these inputs A0–A4, recognizes the signal A0 as representing phase P7, and passes the input P7 to become the output pixel clock. Phase P7 is then used as the clock for the scan line initiated by the SOS signal. It is understood that the pixel clock may change for the next line depending upon the arrival of the next SOS signal. As one example and referring again to FIG. 4, a second SOS' signal arrives with its leading edge represented by the dashed vertical line. For this SOS' signal, phase P5 has the next rising edge. Phases P1–P4 are all high. Thus the latched multiplexed address line, say A 1, has an address of 1111. This is recognized by the multiplexer which enables P5 as the pixel clock for the next scan line.

The above-described embodiment generates accurate clock signals in the 20–80 mHZ range. FIGS. 5 through 9 show alternate circuitry which use exclusive OR and divider circuits which work well at input frequencies up to 250 mHZ. These circuits do not require delay lines which can be expensive components for some applications.

Figure 5:
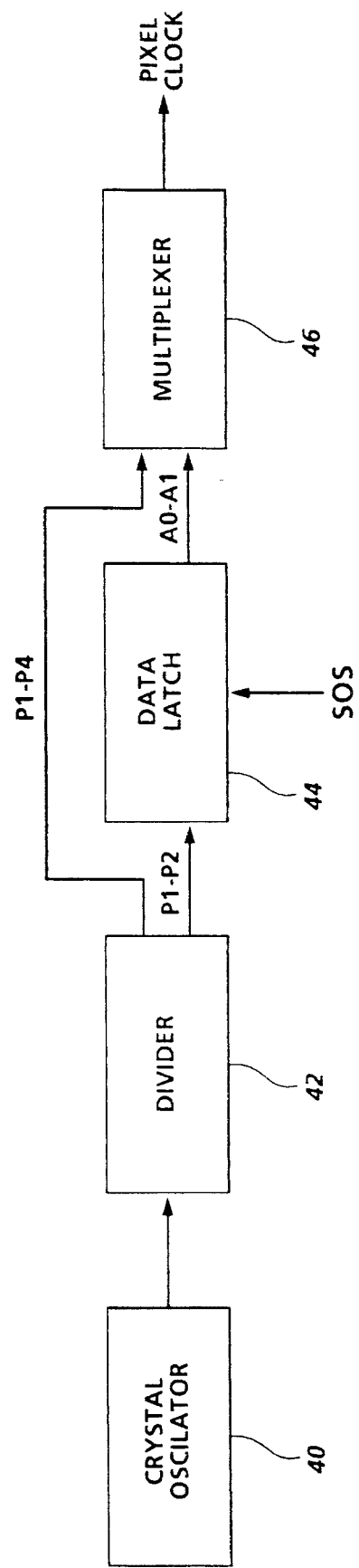
FIG. 5 is a block diagram of a second embodiment of circuitry used to generate an accurate, multi-phase clock.

Referring to FIG. 5 in a second embodiment, crystal oscillator 40 is set at a frequency equal to two times its desired final output frequency. The oscillator frequency is subdivided by a divider circuit 42, which forms four phase outputs P1–P4 shown in FIGS. 6. Outputs P1 and P2 separated by 90° are loaded into data latch circuit 44. Outputs P1–P4 are sent as inputs to multiplexer 46. As described below, in connection with FIGS. 6 and 7, an SOS signal is sent to data latch circuit 44 and the state of phases P1 and P2 is latched onto the rising edge of the SOS signal.

The latched multiplexed outputs A0, A 1 become the address for multiplexer 46. A logic circuitry in multiplexer 46 decodes the inputs A0–A1 and passes one of the P1–P4 inputs having the next rising edge after receipt of the SOS signal at data latch circuit 44. This phase signal then becomes the pixel clock signal.

Figure 6:
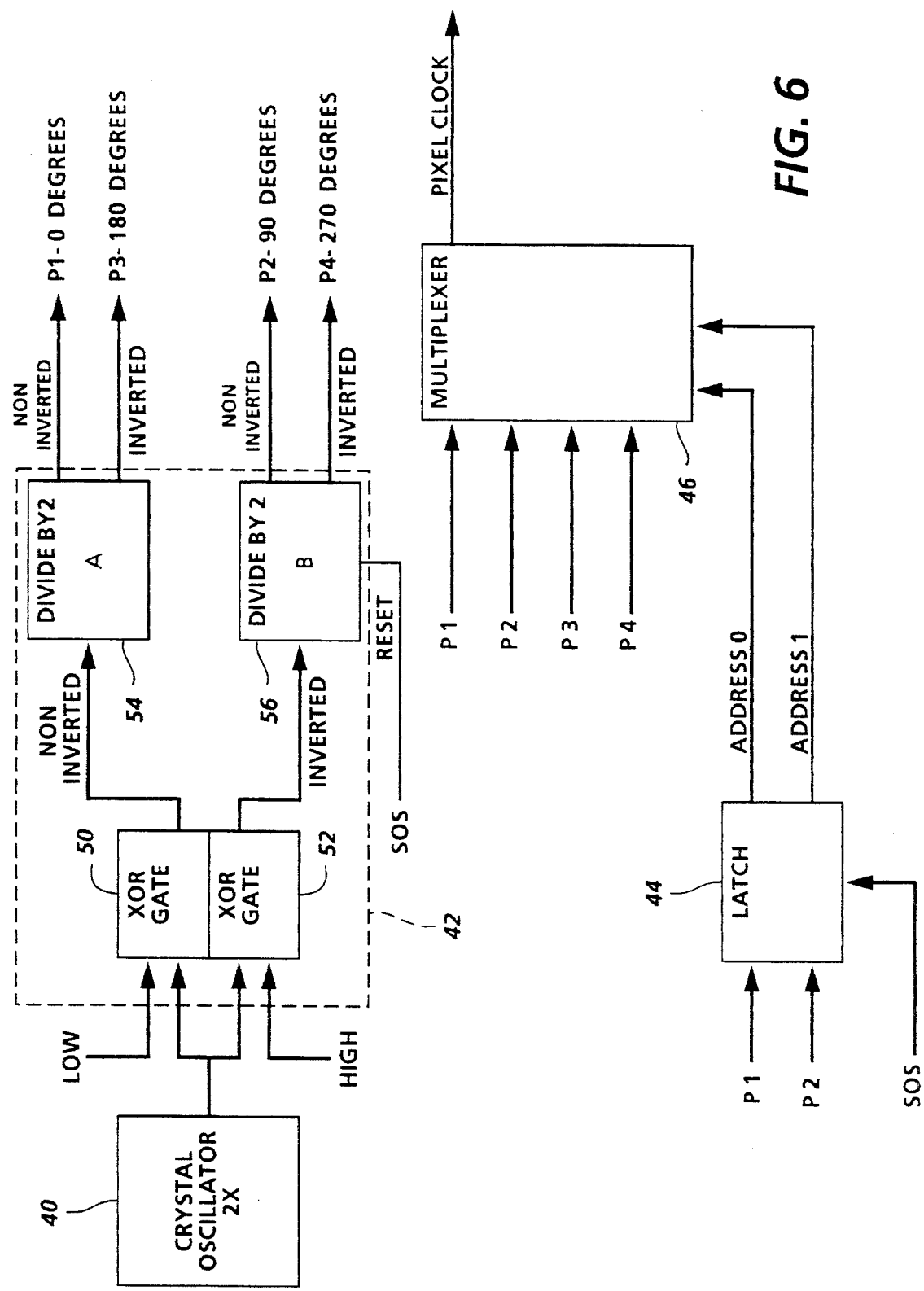
FIG. 6 shows circuitry to subdivide the output of the crystal oscillator shown in FIG. 5 to produce four clock phases.
Figure 7:
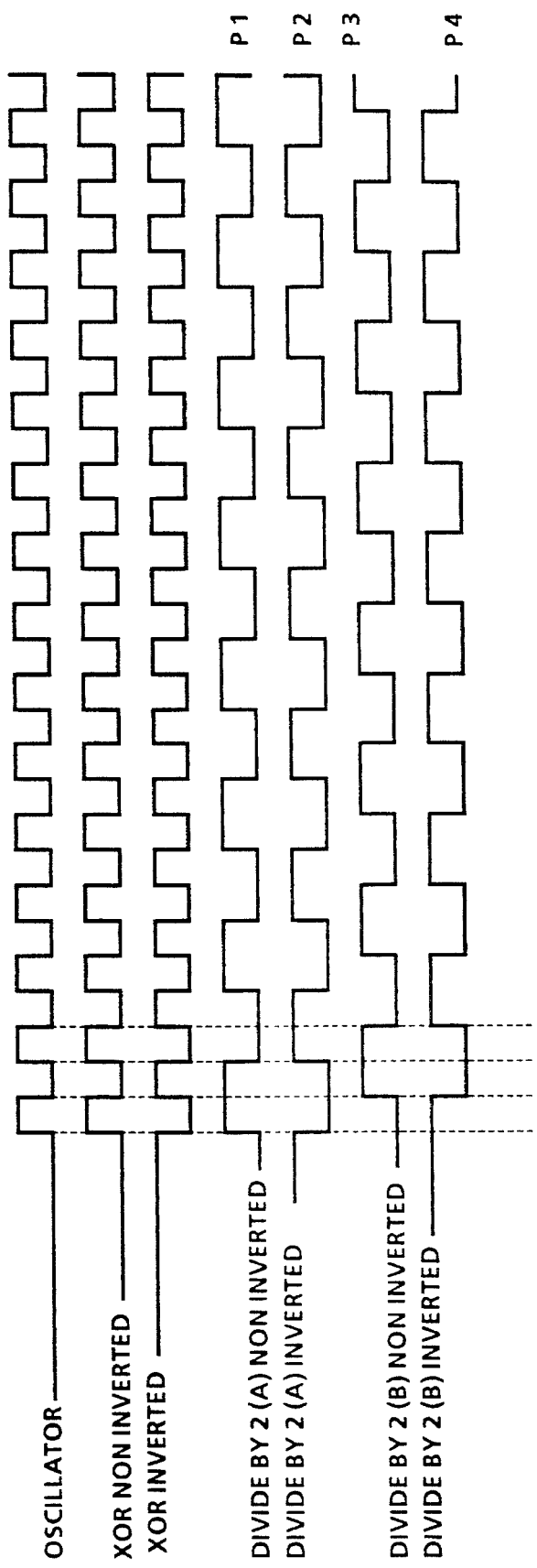
FIG. 7 is a timing diagram for the FIG. 6 circuit.

FIG. 6 shows a specific embodiment for the circuitry of FIG 5 for a four phase output while FIG. 7 is a timing diagram for this circuit. Referring to FIGS. 6 and 7, the output of square wave crystal oscillator 40 is set at times the desired output frequency. Two exclusive OR gates 50, 52 are used to eliminate any skew between the 2X clock that would occur if an inverter were used to generate the inverted clocks. The inverted and noninverted outputs from gates 50, 52 are divided by divide by two counters 54, 56. Counters 54, 56 are reset by the SOS signal to insure that they always begin a scan line in the same state. The inverted and noninverted outputs of counters 54, 56 are used to generate phase P1–P4 signals separated by 90°, which are selected by multiplexer 46. At SOS, the state of phase signals P1, P2 are latched in a data latch circuit 44. The state of phase P1 and P2 determines which clock phase is the next rising edge closes to SOS. Phases P1–P4 are inputed to the multiplexer 46 such that the address lines A0 and A1 select the clock phase that is the next rising edge closest to SOS. This circuit achieves plus or minus 1/8 pixel jitter.

Figure 8:
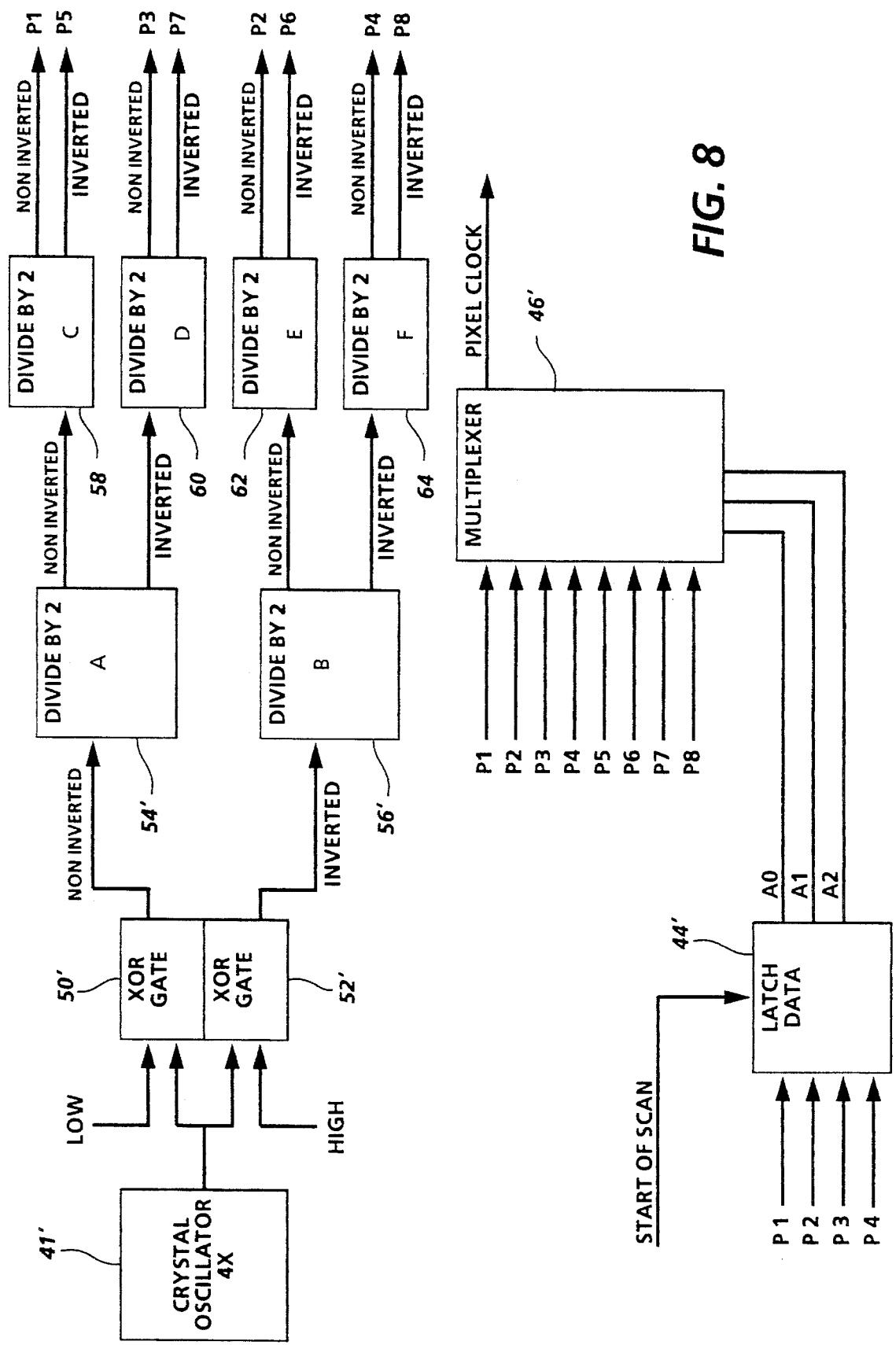
FIG. 8 is an alternate embodiment of the circuitry of FIG. 6, which produces eight clock phases.
Figure 9:
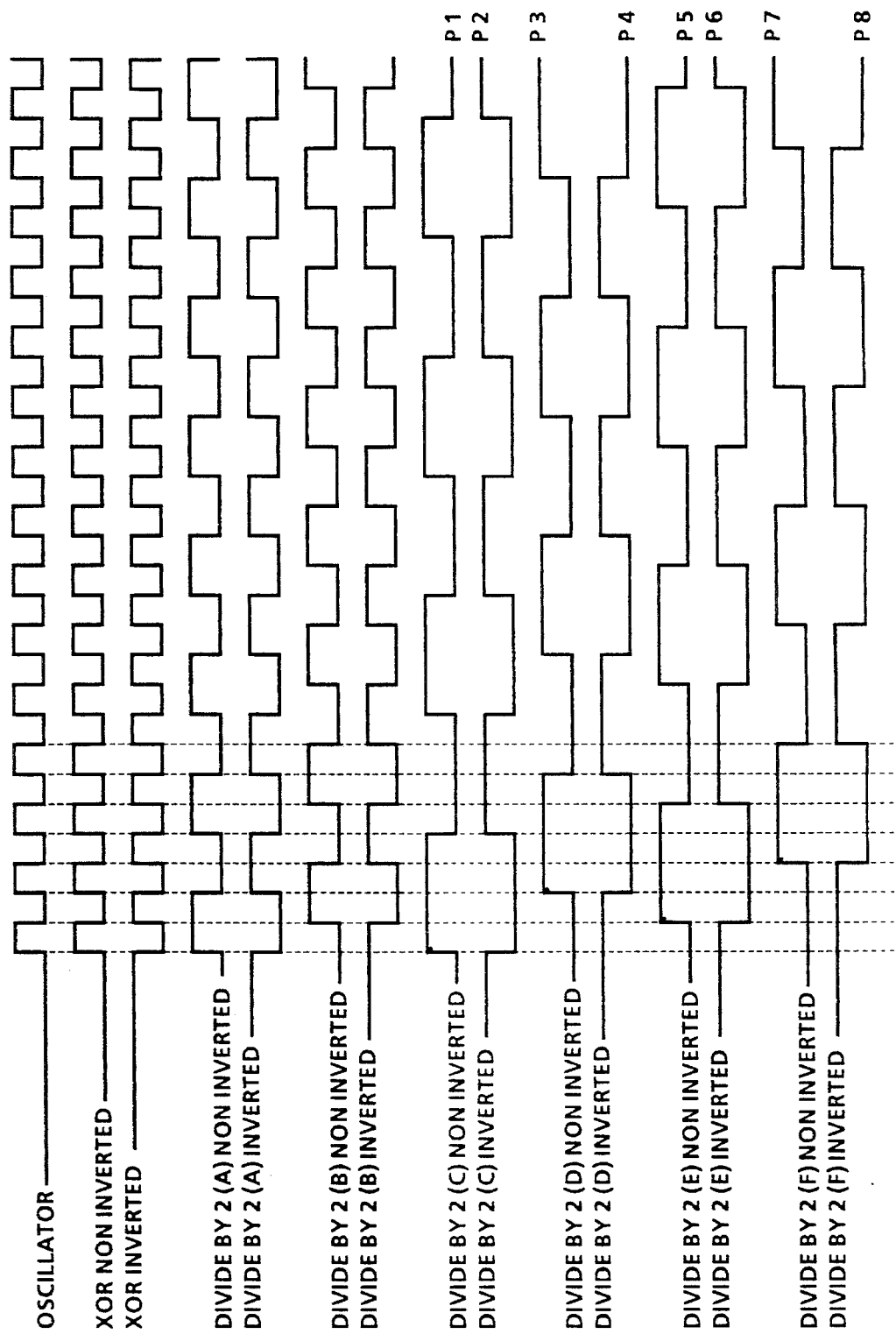
FIG. 9 is a timing diagram for the FIG. 8 embodiment.

FIG. 8 is an alternative embodiment to FIG. 6 with the crystal oscillator 41' frequency set at four times its desired output frequency to obtain eight output phases P1–P8. Jitter accuracy of plus or minus 1/16 pixel jitter is attainable with this circuit. The circuit differs from FIG. 6 in that, in addition to dividers 54', 56', a second divide by two stage includes divide by two counters 58, 60, 62, 64. The operation is similar to that described above for the four phase circuit, except outputs P1–P4 separated by 90° are loaded into data latch 44' and outputs P1–P8 are sent to multiplexer 46'. FIG. 9 is a timing diagram for FIG. 8 circuits.

The circuit shown in FIGS. 5, 6 and 8 can have variable input frequencies unlike the circuit of FIGS. 1–3, which because of the delay circuitry, can operate only at a fixed frequency. The divider circuits of FIGS. 5–8 also have higher accuracy because all phases are fully synchronous with minimum skew. The delay device circuitry is dependent on the accuracy of propagation through the delay circuits.

While the invention has been described with reference to the structure disclosed, it will be appreciated that numerous changes and modifications are likely to occur to those skilled in the art, and it is intended to cover all changes and modifications which fall within the true spirit and scope of the invention. As one example, a programmable logic circuit could be used instead of the multiplexer shown in FIGS. 3 and 6.

I claim:

1. A method of reducing fast scan jitter as the scanning beam of a Raster Output Scanner scans across a recording member, said scanner including means for modulating said beam in accordance with signal inputs controlled by a pixel clock, said method comprising the steps of:

detecting said recording beam prior to the start-of-scan (SOS) of a scan line and generating an SOS output signal having a rising and falling edge, subdividing the output of a crystal oscillator into multiple phased outputs, each output having a rising and leading edge separated by phase, identifying the phased output having a rising edge closest in time to the rising edge of the SOS signal, and using said identified phased output as the pixel clock for the scan line.

2. In a laser scanner including a rotating multifaceted polygon for scanning an image beam across an imaging member to form a plurality of scan lines, the beam modulated in response to image signal scan line information from an image signal source, the combination of:

beam detecting means for producing a start of scan (SOS) signals, multi-phase clocking means for providing pixel clock image signals from said image signal source for each scan line of information, said multi-phase clocking means including:

a crystal oscillator for producing an output signal at a characteristic frequency, circuit means for introducing phase shifts to convert said oscillator output signals into a multi-phased output comprising a plurality of phased signals, rising edges of said signals separated by a phase shift introduced by said circuit means, data latch circuitry adapted to be triggered by arrival of said SOS signal and to latch one of said phased input signals which identifies the phased input signals which has the next rising edge subsequent in time to the rising edge of the SOS signal, said data latch circuitry generating a multiplexed latched output having an address defining said one of said next phased input signals, and logic means for comparing said multi-phased output from said circuit means with the latched output signal from said data latch circuitry and for enabling the phase signal closest to the SOS signal as the pixel clock to control the formation of the next scan line.

3. The laser scanner of claim 2 wherein said circuit means includes delay and inverter means.

4. The laser scanner of claim 2 wherein said crystal oscillator output signal is converted into an inverted and non-inverted signal and wherein said circuit means includes a plurality of divide by two counters to generate inverted and non-inverted signals separated by 90° in phase.

5. The laser scanner of claim 4 wherein said crystal oscillator is set at a frequency twice a desired pixel clock frequency and the counter means includes two divide by two counters.

6. The laser scanner of claim 4 wherein said crystal oscillator is set at a frequency four times a desired pixel clock frequency, and the circuit means includes six divide by two counters.

* * * * *